United States Patent
Ramakrishnan et al.

(10) Patent No.: US 7,792,314 B2
(45) Date of Patent: Sep. 7, 2010

(54) SYSTEM AND METHOD FOR ACQUIRING ACOUSTIC SIGNALS USING DOPPLER TECHNIQUES

(75) Inventors: Bhiksha Ramakrishnan, Watertown, MA (US); Paul H. Dietz, Hopkinton, MA (US); Bent Schmidt-Nielsen, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1540 days.

(21) Appl. No.: 11/110,396

(22) Filed: Apr. 20, 2005

(65) Prior Publication Data

US 2007/0165881 A1    Jul. 19, 2007

(51) Int. Cl.
*H04B 15/00*    (2006.01)
(52) U.S. Cl. .................. 381/94.1; 381/77; 367/93
(58) Field of Classification Search ............. 381/73.1, 381/77, 61, 94.1–94.8; 367/90, 93; 434/8; 73/861.18; 600/453, 437, 407, 300; 704/256, 704/256.1
See application file for complete search history.

(56) References Cited

U.S. PATENT DOCUMENTS

| | | | |
|---|---|---|---|
| 4,542,657 A * | 9/1985 | Barber et al. | 73/861.25 |
| 4,864,307 A * | 9/1989 | Potage et al. | 342/192 |
| 5,086,775 A * | 2/1992 | Parker et al. | 600/453 |
| 5,229,716 A * | 7/1993 | Demoment et al. | 324/307 |
| 5,630,418 A * | 5/1997 | Lee et al. | 600/453 |
| 6,251,077 B1 * | 6/2001 | Mo et al. | 600/455 |
| 6,505,057 B1 * | 1/2003 | Finn et al. | 455/569.2 |
| 6,773,400 B2 | 8/2004 | Njemanze | 600/454 |
| 6,773,403 B2 | 8/2004 | Kim et al. | 600/465 |
| 7,225,013 B2 * | 5/2007 | Geva et al. | 600/513 |

* cited by examiner

*Primary Examiner*—Xu Mei
*Assistant Examiner*—Con P Tran
(74) *Attorney, Agent, or Firm*—Dirk Brinkman; Gene Vinokur

(57) ABSTRACT

A method and system enhances an acoustic signal acquired by a microphone from an acoustic source while concurrently acquiring a Doppler signal from moving parts of the acoustic source. The acoustic signal and the Doppler signal are then analyzed according to a model to generate an enhanced acoustic signal.

16 Claims, 3 Drawing Sheets

SYSTEM AND METHOD FOR ACQUIRING ACOUSTIC SIGNALS USING DOPPLER TECHNIQUES

FIELDS OF THE INVENTION

This invention relates to signal processing, and more particularly to acquiring and enhancing acoustic signals.

BACKGROUND OF THE INVENTION

There are numerous applications, such as hands-free mobile communication, telephony, and hands-free speech recognition, where acoustic signals are acquired by a far-field microphone. In such applications, the acquired acoustic signals often include a large amount of noise, e.g., traffic, crowd, radio, TV, wind, or other ambient noise in the environment. The noise interferes with understanding and otherwise processing the acquired acoustic signals, particularly, in speech recognition.

Doppler techniques have been used for a number of applications. U.S. Pat. No. 6,251,077 issued to Mo et al. on Jun. 26, 2001, "Method and apparatus for dynamic noise reduction for Doppler audio output," describes a method suppressing background noise in spectral Doppler images using adaptive noise-reduction low-pass filters. U.S. Pat. No. 6,773,400 issued to Njemanze on Aug. 10, 2004, "Noninvasive transcranial Doppler ultrasound face and object recognition testing system," describes a method for measuring a baseline blood flow velocity in cerebral arteries while simultaneously testing the subject with face and object recognition tasks. U.S. Pat. No. 6,773,403 issued to Kim et al. on Aug. 10, 2004, "Ultrasonic apparatus and method for measuring the velocities of human tissues using the Doppler effects," describes a method for measuring a velocity of tissue components by sampling echo signals reflected from the human body by generating a frequency distribution of data containing the velocity.

It is desired to use ultra-sonic Doppler techniques for enhancing acoustic signals.

SUMMARY OF THE INVENTION

The invention includes a Doppler ultra-sonic signal generator, an acoustic signal detector, e.g., a microphone, and an ultra-sonic signal sensor. A wideband microphone can also be used to acquire both the acoustic and ultra-sonic signals. The ultra-sonic signal has frequencies that are higher than the nominal audio frequency range, e.g., greater than 20 KHz.

During operation, a human speaker speaks while facing the acoustic detector and ultra-sonic sensor. The detector and sensor can be placed on a desktop, on a stand, or be mounted otherwise, e.g., in a car dashboard or on a rearview mirror. The acoustic microphone acquires the acoustic signals generated by the speaker.

Concurrently, the ultrasonic generator transmits a high-frequency acoustic signal towards the speaker's face. The ultra-sonic signal is reflected by the speaker's face, particularly, the area around the mouth, i.e., the lips, tongue, and chin. The reflected Doppler signal is acquired by the ultra-sonic sensor. The frequency of the reflected Doppler signal is modulated by the motion of the speaker's face, tongue, lips and mouth as the acoustic signal is generated.

Therefore, the acoustic and Doppler signals are highly correlated. The acquired ultra-sonic signal is analyzed jointly with the acoustic signal, in order to enhance the acoustic signal. The enhanced acoustic signal can then be further processed for a number of applications, such as in an improved speech recognition system.

DETAILED DESCRIPTION OF THE PREFERRED EMBODIMENT

System Structure

Figure 1:
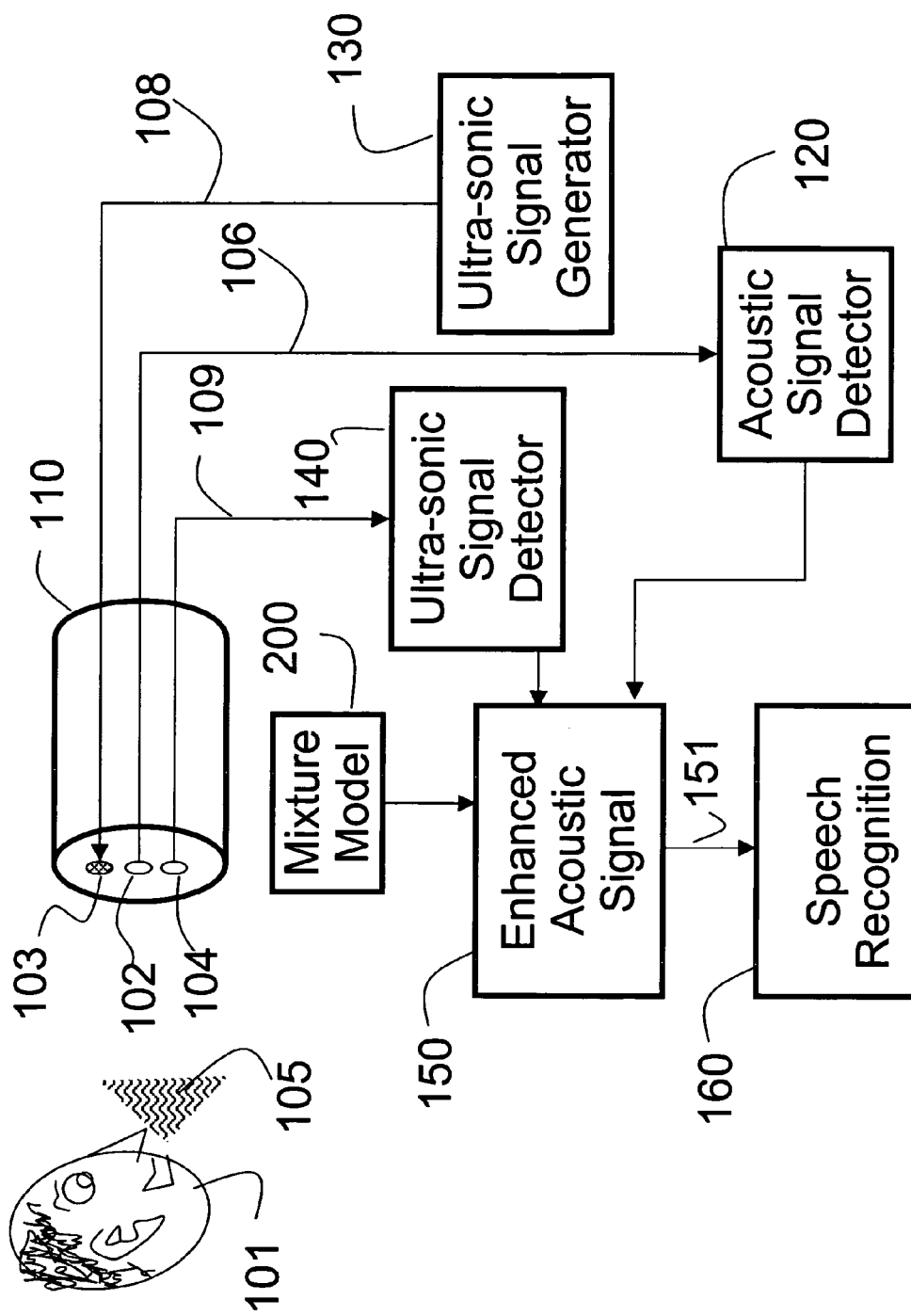
FIG. 1 is a block diagram of the system and method for acquiring acoustic signals according to the invention.

FIG. 1 shows a system 100 for enhancing noisy acoustic signals using ultra-sonic signals. Herein, an acoustic signal is defined as being normally less than 20 KHz, i.e., an acoustic signal can be heard by the human ear, and an ultra-sonic signal has frequencies higher than the acoustic signal. That is, the frequencies of the acoustic signal and the ultra-sonic signals are disjoint.

The system 100 includes a housing 110 that incorporates an acoustic microphone 102, an ultra-sonic transducer 103, and an ultra-sonic sensor 104. The acoustic microphone and ultra-sonic sensor can be replaced by a wideband microphone sensitive over a large range of acoustic frequencies including ultra-sonic Doppler frequencies.

The acoustic microphone 102 acquires a noisy acoustic signal 105 from a source 101, for example, a human speaker. The noisy acoustic signal is converted to an electrical signal 106 representative of the acoustic signal, which is detected 120. It should be noted that the source can be a loudspeaker cone or diaphragm, or some other acoustic source, such a machine with moving parts. In this case, the invention can determine when the machine is operating properly by analyzing jointly the acoustic signals and the reflected Doppler signal modulated according to the moving parts.

An ultra-sonic signal generator 130 produces an ultra-sonic signal 108 for the transducer 103. The ultra-sonic signal is aimed generally at the acoustic source 101, and a reflected Doppler signal 109 is detected separately 140.

When the acoustic signal is produced by moving parts of the acoustic source, e.g., the mouth, lips, and tongue, then the reflected Doppler signal is highly correlated to the corresponding acoustic signal.

Therefore, the invention uses a model that expressed states of 'clean' acoustic spectra and corresponding Doppler spectra. The model can then be used to correlate acquired Doppler signals with corresponding clean acoustic signals to enhance the otherwise noisy acoustic signal.

The detected noisy acoustic signal and the Doppler signal are jointly analyzed according to a model 200 to produce 150 an enhanced acoustic signal 151 with a reduced amount of noise. The enhanced acoustic signal 151 can be processed further, for example, to perform a speech recognition 160.

Mixture Model Training

Figure 2:
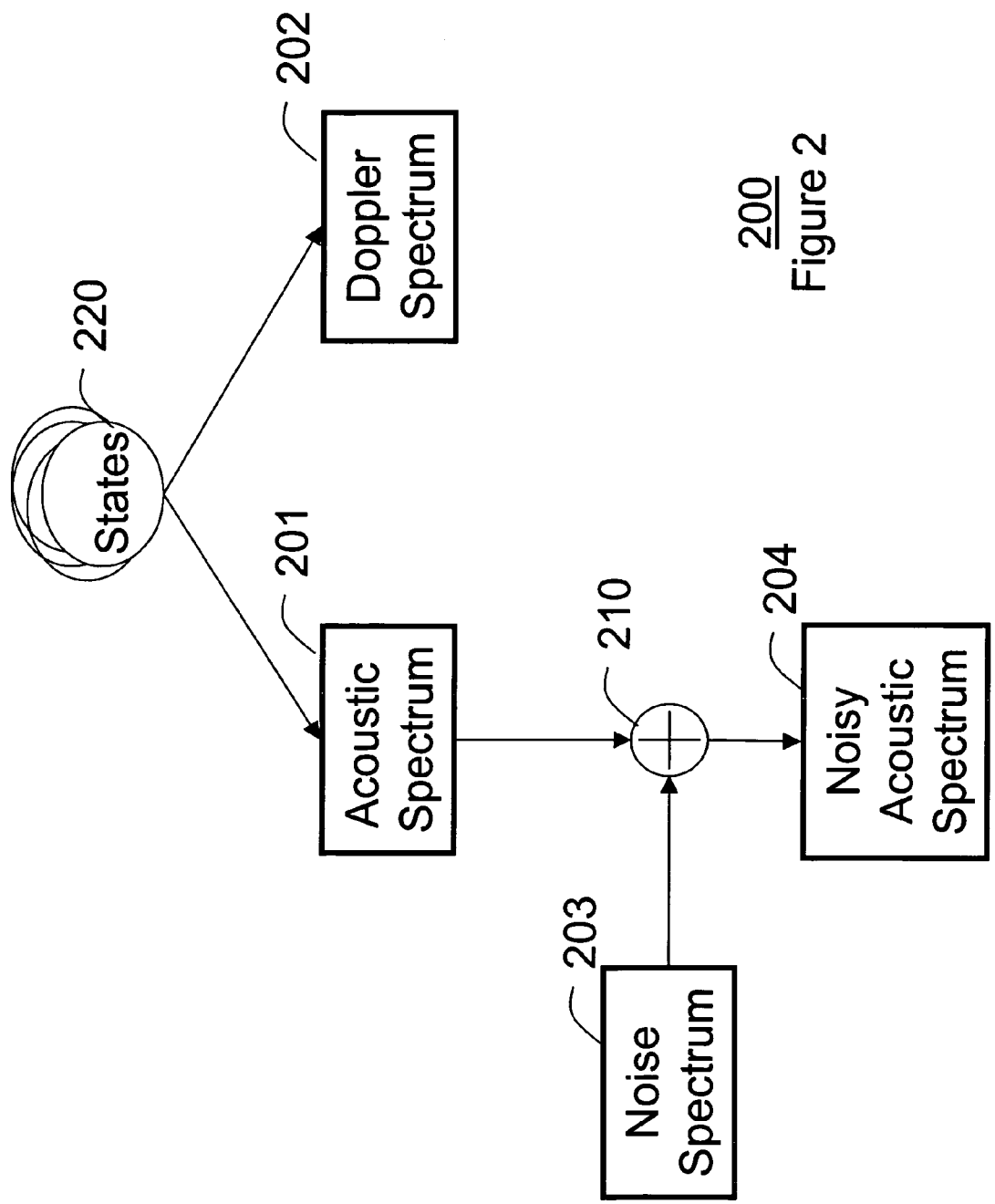
FIG. 2 is a block diagram of a model according to the invention.

FIG. 2 shows a model 200 for enhancing acoustic signals, such as speech, using ultra-sonic signals. The model is trained with an acoustic spectrum 201, a Doppler or ultra-sonic spectrum 202, and a noise spectrum 203. The noise spectrum 203 is added 210 to the acoustic spectrum 201 to produce a noisy acoustic spectrum 204.

The model has multiple states 220. In each state, there is one spectrum 201 for a 'clean' acoustic signal, and one spec trum for a corresponding Doppler signal 202. Such a distribution might be represented mathematically as $$P(S, D) = \sum_z P(z)P(S \mid z)P(D \mid z),$$

where z represents the state, D represents a Doppler spectrum, and S represents the acoustic spectrum, e.g., for a 30 millisecond segment of the acquired signals.

The parameters of the model include a priori probabilities of the states P(z) of the model 200, the state dependent distributions of the Doppler spectra P(D|z), and the state dependent distributions of the acoustic spectra P(S|z). The model is 'trained' from a corpus of concurrent 'clean' acoustic signals and corresponding Doppler signals. The model can be in the form of a mixture of Gaussian distributions, each distribution having a mean and a variance.

Other models, such as hidden Markov models (HMMs) or Bayesian networks, can also be used.

According to the model, the acoustic signal generation process or source, e.g., the face or a machine, is in a different state at every instant in time. In that state, the source generates a single spectrum for the acoustic signal, and concurrently, a corresponding single spectrum for the Doppler signal that can be correlated to the acoustic signal. The acoustic spectrum 201 is corrupted by the additive noise 203 to generate the noisy acoustic spectrum 204.

Estimating Enhanced Acoustic Signals From Noisy Acoustic Signals

Figure 3:
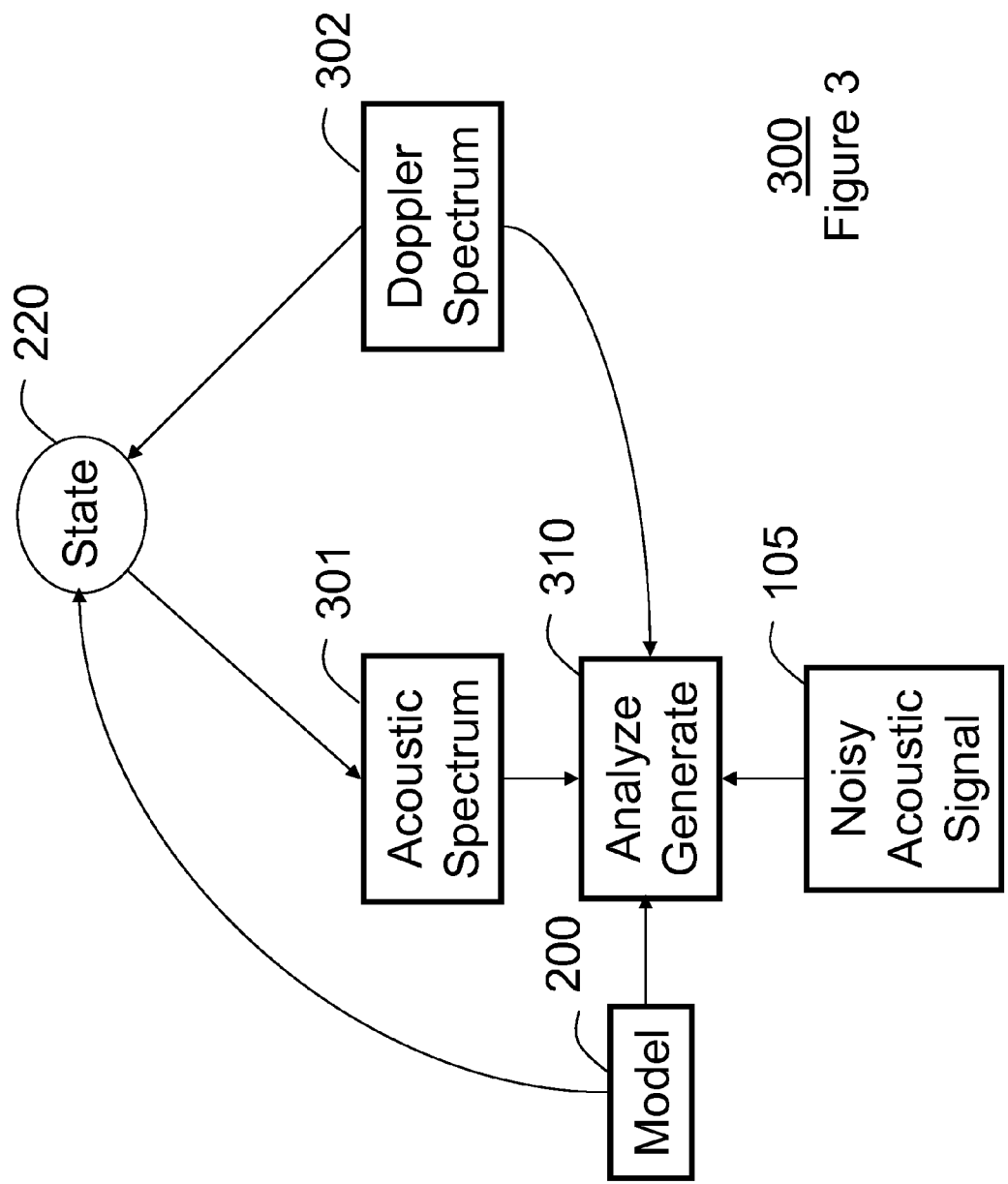
FIG. 3 is a block diagram of a method for enhancing acoustic signals according to the invention.

FIG. 3 shows a method 300 for obtaining the enhanced acoustic signal 151 estimated from the noisy acoustic signal 105 using the Doppler signal. The higher frequency Doppler spectrum 302 is uncorrupted by the lower frequency acoustic noise. The Doppler spectrum provides 'evidence' that is used to estimate a posteriori probabilities of the various states 220 of the model 200. These estimates are considered reliable because the Doppler signal is uncorrupted by acoustic noise.

The model for the noise spectrum is used to obtain state-dependent estimates of the enhanced acoustic spectrum 301 from the noisy acoustic signal 105 in an analysis and generating step 310. The noise and Doppler spectra are combined, using the a posteriori probabilities of the states obtained from the Doppler signal, as weights, to generate an estimate for the enhanced acoustic signal 151.

The example procedure can be described as follows. Let Y represent the acoustic spectrum of noisy speech. Let $f(S, N)$ represent a function that expresses the effect of noise N on the acoustic spectrum S of the clean acoustic signal, i.e., Y=$f$(S, N). The noise is unknown. N is not known.

Ideally, if the clean acoustic spectrum S were also known, then the noise could be estimated through an inverse function N=$f^1$(Y, S). Unfortunately, the clean speech spectrum S is also unknown. However, if the state z that generated the acoustic spectrum S is known, then the noise N can be estimated as N≈$f^1$(Y, $\mu_z$) where $\mu_z$ is the mean value of the state dependent distributions of the acoustic spectra, P(S|z). However, the state z is also unknown, and cannot be estimated accurately from the acquired acoustic signal because the acoustic signal is noisy. However, the Doppler spectrum D has not been corrupted by noise, and evidence can be derived from the Doppler spectrum to estimate an a posteriori probability of the state z as:

$$P(z, D) = (P(z)P(D \mid z)) \Big/ \left( \sum_z P(z')P(D \mid z') \right).$$

Then, the estimated spectrum for the noise can be obtained as a weighted combination of estimates derived from each of the states, where the weight for the state has been obtained from the Doppler spectrum according to:

$$N \approx P(z|D)f^1(Y, \mu_z).$$

The estimated noise can be used to 'de-noise' the spectrum of the acquired acoustic signal through an inverse transformation S≈g(Y, N). This transformation expresses how de-noising can be performed for noisy acoustic signals according to the invention.

It should be understood that the transformation described above is only one example. A variety of transformation functions $f$(.) and g(.) can be used by the procedure. Similarly other statistical models can also be used represent the various spectra.

A number of applications, such as speech recognition, can operate on the enhanced acoustic signal according to the invention. For example, the invention can be used to de-noise signals in automobiles for hands-free telephony, on cell phones for enhancing transmitted signals when they are used in noisy environments, or to diagnose an operation of machinery and detect potential failures.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for enhancing a noisy acoustic signal, comprising:
    acquiring an acoustic signal from an acoustic source;
    generating an ultra-sonic signal;
    acquiring concurrently an ultra-sonic Doppler signal corresponding to the ultra-sonic signal reflected from moving parts of the acoustic source; and
    analyzing jointly the acoustic signal and the ultra-sonic Doppler signal according to a model to generate an enhanced acoustic signal, wherein the model is a mixture of distributions, and the model includes a plurality of states, each state modeling one acoustic spectrum and one corresponding Doppler spectrum, and the model includes a priori probabilities of the states, state dependent distributions of the Doppler spectra, and state dependent distributions of the acoustic spectra, and wherein the acoustic spectra and Doppler spectra are combined using a posteriori probabilities of the states of the model as weights to generate the enhanced acoustic signal.

2. The method of claim 1, in which the acquired acoustic signal includes noise, and the enhanced acoustic signal has a reduced amount of noise.

3. The method of claim 1, in which the ultra-sonic Doppler signal has a frequency greater than the acoustic signal.

4. The method of claim 1, in which the acoustic signal is acquired by a microphone and the ultra-sonic Doppler signal is acquired by an ultra-sonic sensor.

5. The method of claim 1, in which the acoustic source is a human speaker.

6. The method of claim 5, further comprising:
performing speech recognition on the enhanced acoustic signal.

7. The method of claim 5, further comprising:
enhancing noisy speech in automobiles for hands-free telephony.

8. The method of claim 5, further comprising:
enhancing noisy speech on cellular phones operating in noisy environments.

9. The method of claim 1, in which the acoustic source is a machine with moving parts.

10. The method of claim 9, further comprising:
diagnosing an operation of the machine.

11. The method of claim 1, in which the acoustic source is a loudspeaker.

12. The method of claim 1, further comprising:
training the model with a plurality of clean acoustic spectra and a plurality of corresponding Doppler spectra.

13. The method of claim 1, in which the distributions are Gaussian distributions.

14. The method of claim 1, in which the model is a hidden Markov model.

15. The method of claim 1, in which the model is a Bayesian network.

16. A system for acquiring and enhancing an acoustic signal, comprising:
a microphone configured to acquire an acoustic signal from an acoustic source;
an ultra-sonic signal generator to produce an ultra-sonic signal;
a sensor configured to acquire concurrently an ultra-sonic Doppler signal corresponding to the ultra-sonic signal reflected from moving parts of the acoustic source; and
means for analyzing jointly the acoustic signal and the Doppler signal according to a model to generate an enhanced acoustic signal, wherein the model is a mixture of distributions, and the model includes a plurality of states, each state modeling one acoustic spectrum and one corresponding Doppler spectrum, and the model includes a priori probabilities of the states, state dependent distributions of the Doppler spectra, and state dependent distributions of the acoustic spectra, and wherein the acoustic spectra and Doppler spectra are combined using a posteriori probabilities of the states of the model as weights to generate the enhanced acoustic signal.

* * * * *